(12) United States Patent
Frey et al.

(10) Patent No.: US 6,802,245 B2
(45) Date of Patent: Oct. 12, 2004

(54) BRAKE BOOSTER

(75) Inventors: Karl-Heinz Frey, Lahnstein (DE);
Peter Ortel, Waldesch (DE); Friedel Günther Lahuis, Koblenz (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/414,618

(22) Filed: Apr. 16, 2003

(65) Prior Publication Data

US 2003/0172804 A1 Sep. 18, 2003

Related U.S. Application Data

(63) Continuation of application No. PCT/EP01/11645, filed on Oct. 9, 2001.

(30) Foreign Application Priority Data

Oct. 17, 2000 (DE) .......................................... 100 51 385

(51) Int. Cl.⁷ ................................................. B60T 7/06
(52) U.S. Cl. .......................................... 92/129; 92/188
(58) Field of Search .......................... 60/533; 91/369.2, 91/376 R; 92/129, 140, 187, 188

(56) References Cited

U.S. PATENT DOCUMENTS

| | | | |
|---|---|---|---|
| 3,173,266 A | * | 3/1965 | Shutt ............................ 92/187 |
| 4,831,916 A | * | 5/1989 | Leigh-Monstevens et al. ............................ 92/187 |
| 6,470,791 B1 | | 10/2002 | Welter et al. ................. 92/188 |
| 6,505,539 B2 | | 1/2003 | Schlüter ..................... 91/369.2 |

FOREIGN PATENT DOCUMENTS

| | | | |
|---|---|---|---|
| DE | 31 49 628 | 7/1983 | |
| DE | 33 07 888 | 9/1984 | |
| DE | 195 21 281 | 12/1996 | |
| DE | 197 52 076 | 5/1999 | |
| DE | 198 43 316 | 3/2000 | |
| DE | 19843316 A1 | * 3/2000 | ........... F16C/11/06 |
| FR | 2 788 095 | 7/2000 | |
| WO | 88/08801 | 11/1988 | |
| WO | 00/07862 | 2/2000 | |

* cited by examiner

Primary Examiner—Thomas E. Lazo
(74) Attorney, Agent, or Firm—MacMillan, Sobanski & Todd, LLC

(57) ABSTRACT

A brake booster having an input element (20) for actuating the brake booster is described. The input element (20) at its end facing a brake pedal has a receiving sleeve (20A) for an actuating rod (34), which is to be coupled to the brake pedal. Disposed inside the receiving sleeve (20A) is a spring sleeve (36) comprising at least one spring element (36C, 36D), which cooperates with the actuating rod (34) when the latter is brought into a detent position in relation to the input element (20). The spring element (36C, 36D) extends substantially in axial direction and is actuable in a spring-elastic manner in a radially outward direction. The spring sleeve (36) at its brake pedal-side end has a radially outwardly extending portion (36F), which is fastened by means of a bead (20D) of the receiving sleeve (20A) to the receiving sleeve (20A).

21 Claims, 4 Drawing Sheets

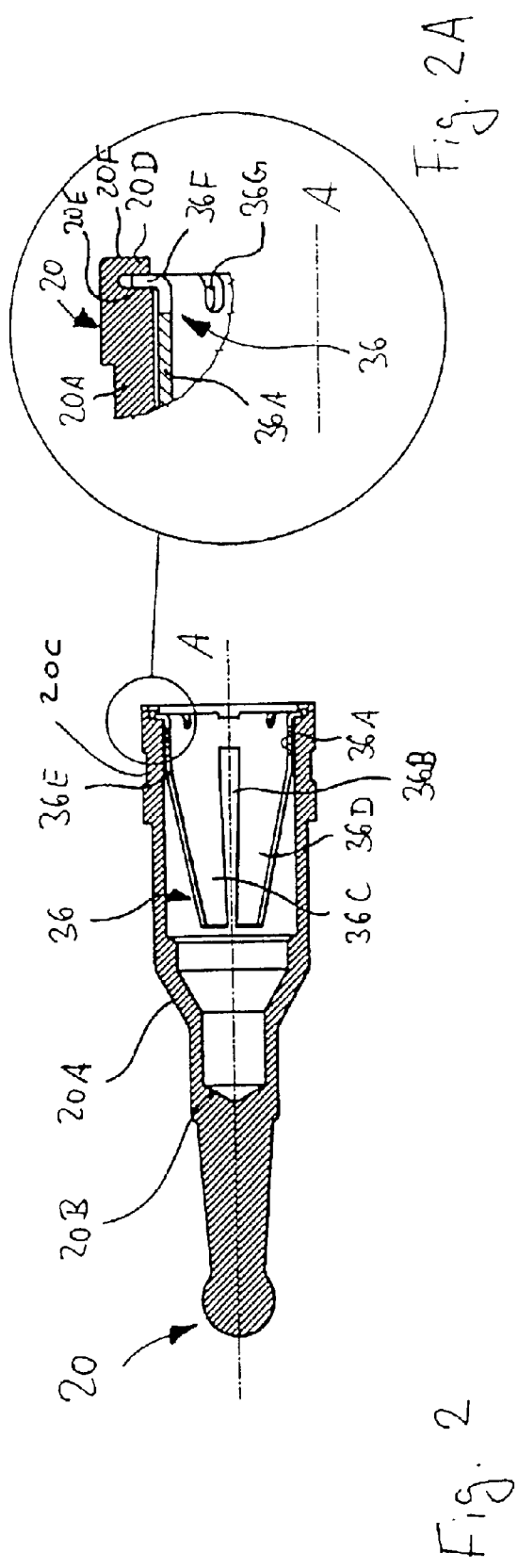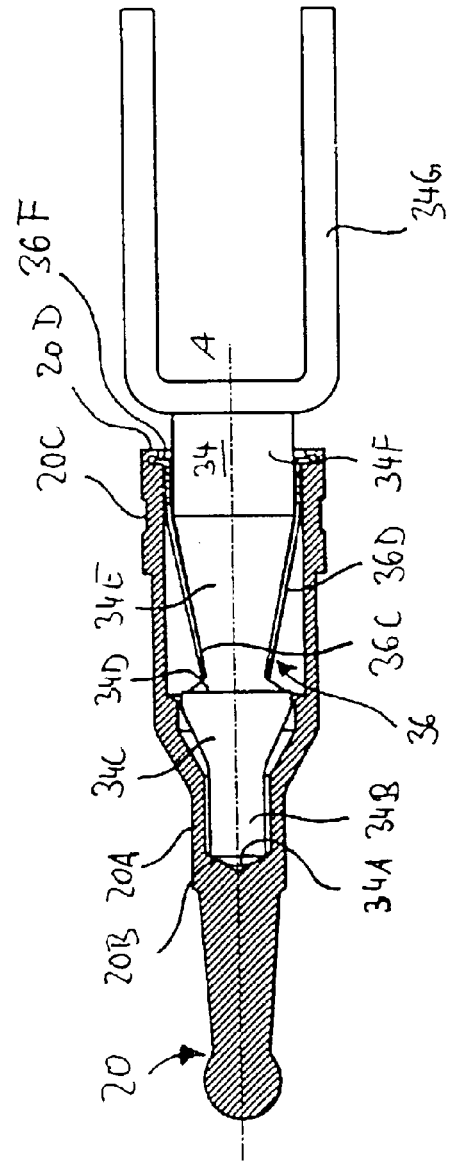
Fig. 2
Fig. 2A
Fig. 3

BRAKE BOOSTER

CROSS REFERENCE TO RELATED APPLICATIONS

This application is a continuation of International Application No. PCT/EP01/11645 filed Oct. 9, 2001, which claimed priority to German Patent Application No. 100 51 385.9 filed Oct. 17, 2000, the disclosures of which are, incorporated herein by reference.

BACKGROUND OF THE INVENTION

The invention relates to a brake booster comprising an input element for actuating the brake booster, which input element at its brake pedal-side end has a receiving sleeve for an actuating rod, wherein a spring sleeve is provided, which is disposed at least partially inside the receiving sleeve and has a substantially axially extending spring element, which cooperates with the actuating rod when the latter is brought into a detent position in relation to the input element and which is actuable in a spring-elastic manner in a radially outward direction.

From WO 00/07862, and corresponding U.S. Pat. No. 6,505,539 which is incorporated by reference herein, a conventional brake booster is known. An input element of the brake booster is designed at its brake pedal-side end as a fork provided with a transverse bore. To couple a brake pedal lever to the input element, the brake pedal lever, which is likewise provided with a transverse bore, is introduced into the fork and connected by means of a transverse bolt to the fork. The transverse bolt is then secured to prevent it from accidentally falling out.

From DE 33 07 888 A1, which is incorporated by reference herein, a further brake booster is known. Said brake booster has a load transmission arrangement with an input element, which at its end facing the brake pedal has a sleeve-shaped receiver for an actuating rod, which is actuable by means of the brake pedal. The shell of the sleeve-shaped receiver of the input element is provided with an opening, through which a spring element extends in radial direction. The spring element has two spring portions projecting into the interior of the sleeve-shaped receiver as well as two limbs embracing the radially outer side of the receiver. To couple the actuating rod to the input element, the actuating rod is inserted into the sleeve-shaped receiver until the spring portions projecting into the interior of the sleeve-shaped receiver latch into a peripherally extending groove of the actuating rod.

The free spring end of the spring element opposes axial loading both in and counter to the actuating direction of the brake booster with, in each case, substantially the same spring force. However, while in the event of axial loading of the free end of the spring element in actuating direction a comparatively low spring force is desirable to enable the actuating rod to be brought without a great expenditure of force into the detent position, in the event of axial loading of the free end of the spring element counter to actuating direction, on the other hand, a comparatively high spring force is desirable in order to prevent the actuating rod from being pulled out of the receiving sleeve. The load transmission arrangement according to DE 33 07 888 A1 is incapable of fully meeting said requirements.

From DE 198 43 316 A1, which is incorporated by reference herein, a further load transmission arrangement comprising a plurality of spring elements is known. The load transmission arrangement comprises an input element, which at one of its two ends has a receiving sleeve for an actuating rod. A spring sleeve comprising a plurality of substantially axially extending spring elements is disposed inside the receiving sleeve in such a way that the spring elements, which are actuable in a spring-elastic manner in a radially outward direction, cooperate with the actuating rod when the latter is brought into a detent position in relation to the input element.

For connecting the spring sleeve to the receiving sleeve, the spring sleeve at its end facing the actuating rod has a radially outwardly extending collar, which cooperates in the load transmission direction of the actuating rod with an end of the receiving sleeve facing the actuating rod. To prevent the spring sleeve from detaching from the receiving sleeve when the spring sleeve is loaded by an axial force counter to the load transmission direction of the actuating rod, the spring sleeve in a portion disposed inside the receiving sleeve has a plurality of extensions, which extend in a radially outward direction. Said extensions are supported against a step in the interior of the receiving sleeve so that the spring sleeve does not detach from the receiving sleeve even when loaded with an axial force counter to the load transmission direction of the actuating rod.

To couple the actuating rod to the input element, the actuating rod is inserted into the receiving sleeve until a spherical head of the actuating rod facing the input element has passed the spring elements and the spring elements engage behind the spherical head. The spring elements, which engage behind the spherical head and cooperate counter to the actuating direction of the actuating rod with the spherical head, guarantee that a force introduced counter to actuating direction into the actuating rod is transmitted from the spherical head to the spring elements and from the spring elements to the receiving sleeve connected to the input element. The actuating rod is consequently reliably coupled to the input element not only in actuating direction but also counter to actuating direction.

The drawback of the load transmission element known from DE 198 43 316 A1 is however that the connection of the spring sleeve to the receiving sleeve is complex and hence cost-intensive. This is due above all to the fact that, for connecting the spring sleeve to the receiving sleeve, an undercut has to be disposed in the deepest portion of the receiving sleeve. Said undercut is used to form the step, with which the radially outwardly extending extensions of the spring sleeve cooperate counter to the actuating direction of the actuating rod.

SUMMARY OF THE INVENTION

The object of the invention is to provide a brake booster which guarantees an improved and, particularly from a manufacturing point of view, more easily realizable connection of the spring sleeve to the receiving sleeve.

Said object is achieved in a brake booster of the type described initially in that the spring sleeve at its brake pedal-side end has a radially outwardly extending portion, which is fastened by means of a bead of the receiving sleeve to the latter. The bead guarantees that both forces introduced in actuating direction and forces introduced counter to actuating direction into the spring sleeve may be reliably transmitted to the receiving sleeve. The bead is moreover extremely inexpensive to realize.

The radially outwardly extending portion of the spring sleeve preferably takes the form of a circumferential or at least in sections circumferential collar. Such a refinement guarantees particularly reliable transmission of forces, which are introduced into the spring sleeve, to the receiving sleeve.

The spring sleeve may comprise two or more spring elements, which cooperate with the actuating rod and surround the radially outer side of the actuating rod. The individual spring elements are expediently separated from one another by slots extending substantially in axial direction. For adjustment of the restoring forces of the spring elements, said slots may at their ends facing the spring sleeve widen in peripheral direction of the spring sleeve. The wider the slots in peripheral direction, the more the restoring forces of the spring elements decrease. This is due to the fact that the webs, by which the spring elements are connected to the spring sleeve, become progressively thinner. According to a preferred embodiment of the invention, the widened portions of the slots at their ends facing the spring sleeve take the form of circular recesses. The slots consequently open at their ends facing the spring sleeve into circular recesses. By means of the diameter of the circular recesses it is likewise possible to exert an influence upon the restoring forces of the spring elements.

According to a preferred embodiment of the invention, the spring element cooperates, e.g. via its free end which is actuable in a spring-elastic manner in a radially outward direction in relation to the receiving sleeve, with a first oblique face of the actuating rod. Said oblique face advantageously has a radial extension increasing in actuating direction and is preferably flat, i.e. not curved, in axial direction. When the actuating rod from the detent position is then acted upon by a tensile force acting counter to the actuating direction, the tensile force is introduced via said oblique face of the actuating rod axially into the free end of the spring element. The axial force introduced into the spring element is in turn introduced by the latter into the receiving sleeve and/or the input element.

A first oblique face of the actuating rod is preferably disposed so as to be inclined relative to the spring element in such a way that the free end of the spring element in the detent position opens approximately at right angles into the first oblique face. Such an arrangement of first oblique face and spring element achieves the optimum introduction of force from the first oblique face into the spring element.

The actuating rod may have, in actuating direction upstream of the first oblique face, a further, second oblique face which is inclined in such a way that the first and second oblique faces form a notch-like profile. The second oblique face is preferably disposed relative to the spring element in such a way that the spring element in the detent position is at least in sections in surface contact with the second oblique face of the actuating rod. The actuating rod may moreover have, in actuating direction downstream of the first oblique face, a third oblique face with a radial extension decreasing in actuating direction. When the actuating rod is being introduced into the detent position, a cooperation of the third oblique face with the spring element advantageously ensues.

At least one of the oblique faces of the actuating rod is preferably designed as a conical portion. Such a rotationally symmetrical design of the oblique faces is advantageous because it then allows the actuating rod to be introduced in any angular position relative to a longitudinal axis of the actuating rod into the receiving sleeve of the input element.

Two or more spring elements cooperating with the actuating rod may be provided, which together in the form of a hollow cylinder or a portion of a hollow cylinder concentrically surround the radially outer side of the actuating rod. By virtue of a plurality of spring elements, forces may be introduced more uniformly from the spring elements into the actuating rod and/or from the actuating rod into the spring elements.

The spring elements may be formed e.g. as finger-like strips integrally with the e.g. hollow-cylindrical spring sleeve. The spring sleeve preferably extends parallel to the receiving sleeve and lies against the radially inner surface of the latter. The spring elements may adjoin the spring sleeve in actuating direction in the form of radially inwardly bent strips. The inside diameter defined by the free ends of said inwardly bent strips is accordingly smaller than the inside diameter of the hollow-cylindrical spring sleeve.

The receiving sleeve may be provided at its end facing the brake pedal with a funnel-shaped widening of its inside diameter. Such a refinement of the end of the receiving sleeve facing the brake pedal guarantees that the detent connection between actuating rod and input element may be easily established even in the event of the actuating rod being disposed off-center when the actuating rod is introduced into the receiving sleeve.

The funnel-shaped widening of the inside diameter of the receiving sleeve may be realized, for example, by fastening a funnel-shaped component to the brake pedal-side end of the receiving sleeve. The receiving sleeve may have radially at the outside a peripherally extending groove, into which a peripherally extending rib disposed radially at the inside of the funnel-shaped component may be latchingly introduced in order to fasten the funnel-shaped component. Conversely, the receiving sleeve may be provided radially at the outside with a rib and the funnel-shaped component may be provided radially at the inside with a corresponding groove.

According to a preferred embodiment of the invention, an actuating element, which is disposed e.g. in relation to the actuating rod radially at the outside and is movable axially relative to the actuating rod, is provided for actuating the at least one spring element. By means of the actuating element each spring element of the spring sleeve may be swivelled radially outwards in order thereby to release the coupling, occasioned by the spring elements, of the actuating rod counter to actuating direction to the input element.

The actuating element may comprise a portion, which extends into the spring sleeve and cooperates with the at least one spring element. The actuating element may moreover be provided radially at the outside with a step, which cooperates with an end face of the receiving sleeve facing the step in order to limit the axial mobility of the actuating element. The actuating element preferably takes the form of a sleeve guided on the actuating rod and may be coupled by means of a screw-type connection to the actuating rod. The screw-type connection allows an axial relative motion between actuating element and actuating rod.

BRIEF DESCRIPTION OF THE DRAWINGS

FIG. 2 is an enlarged longitudinal section through the input element of the brake booster according to FIG. 1.

FIG. 2A is an enlarged section of a portion of the input element of FIG. 2.

FIG. 3 a longitudinal section according to FIG. 2, which shows the actuating rod in a detent position in relation to the input element, FIG. 4 a longitudinal section through a spring sleeve, which is slightly modified compared to the spring sleeve shown in FIGS. 1 to 3, and FIG. 5 a longitudinal section through an actuating rod with screwed-on actuating element in a detent position in relation to the input element.

DETAILED DESCRIPTION OF THE INVENTION

Figure 1:
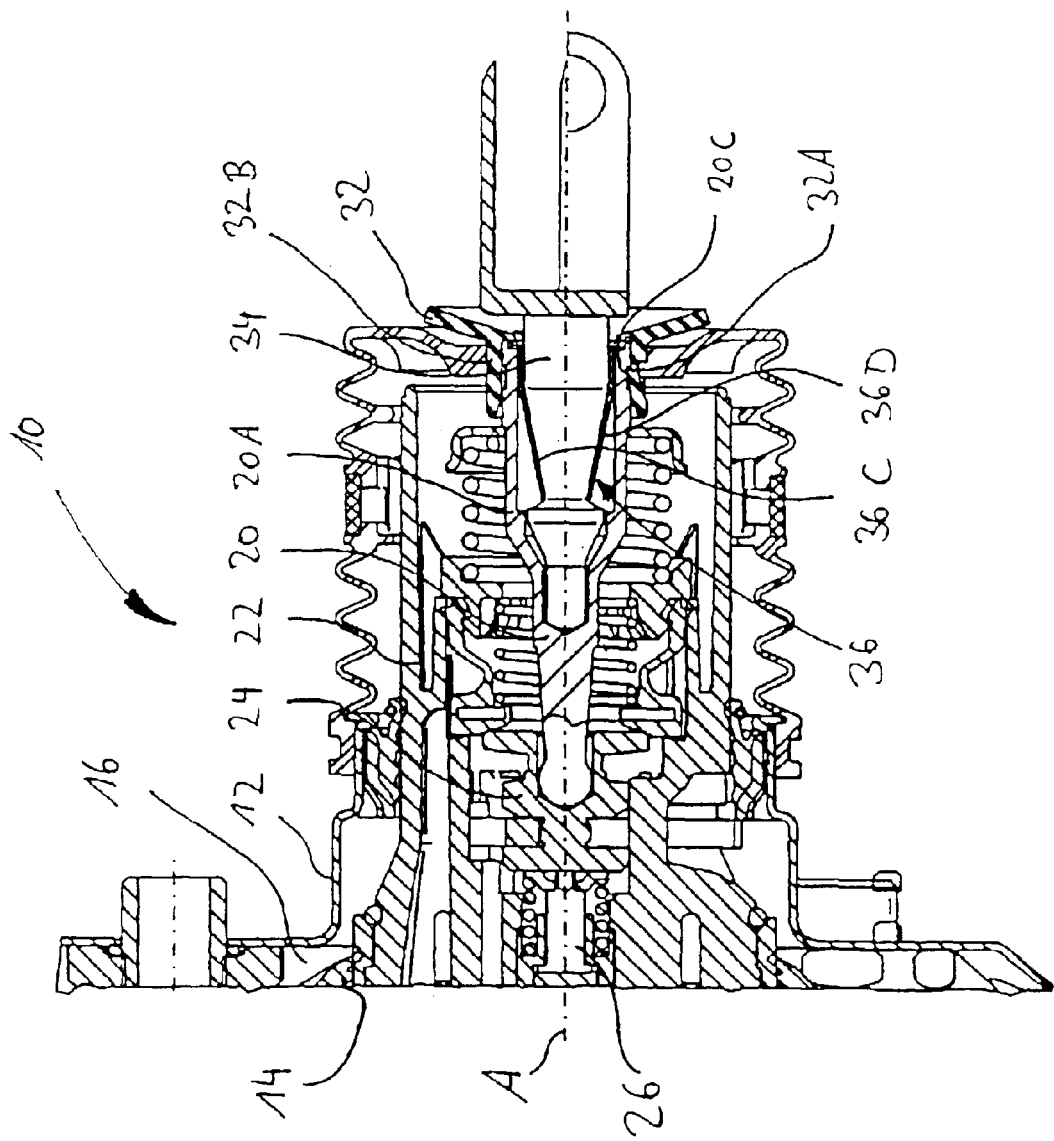
FIG. 1 a longitudinal section through the relevant region of a first brake booster according to the invention with an actuating rod latched in a receiving sleeve.

FIG. 1 shows a vacuum brake booster 10 having a housing 12 and a movable wall 14 disposed inside the housing 12. The movable wall 14 separates a working chamber 16 from a non-illustrated vacuum chamber. The brake booster 10 is actuated by means of a rod-shaped input element 20, which projects along an axis A into a control valve housing 22. With its spherically designed end facing the working chamber 16 the input element 20 projects into a central opening of a transmission piston 24.

The actuating forces, which are introduced in actuating direction into the input element 20 and summoned up by the driver, are transmitted via the actuating piston 24 and a cylindrical sensing element 26 disposed in actuating direction downstream of the actuating piston 24 to a non-illustrated reaction disk 28, which brings together the actuating forces introduced into the input element 20 and the booster forces introduced into the control valve housing 22 and passes them on to a likewise non-illustrated reaction piston. In a known manner, a master brake cylinder is disposed functionally downstream of the reaction piston.

In the embodiment illustrated in FIG. 1, the input element 20 is formed integrally with a receiving sleeve 20A, which is disposed in actuating direction upstream of the input element 20. A funnel-shaped component 32 is connected radially to the outside of the receiving sleeve 20A at its end facing the non-illustrated brake pedal. The funnel-shaped component 32 has an inside diameter tapering in actuating direction and facilitates the introduction of an actuating rod 34, which is coupled to the brake pedal, into the receiving sleeve 20A.

As may be seen from FIG. 1, the receiving sleeve 20A has radially at the outside of its brake pedal-side end a peripherally extending groove 20C. The funnel-shaped component 32 has a collar 32B, which extends in actuating direction and is provided radially at the inside with a peripherally extending rib 32A. To fasten the funnel-shaped component 32 to the receiving sleeve 20A, the collar 32B of the funnel-shaped component 32, the inside diameter of which substantially corresponds to the outside diameter of the receiving sleeve 20A, is slipped onto the receiving sleeve 20A until the rib 32A latches into the circumferential groove 20C of the receiving sleeve 20A.

The brake booster 10, which is illustrated in FIG. 1, is already fully assembled. The actuating rod 34 is accordingly situated in a detent position in relation to the input element 20. There now follows a description, with reference to FIGS. 2, 2A and 3, of the coupling of the actuating rod 34 to the input element 20 and the connecting of a spring sleeve 36 to the receiving sleeve 20A.

As may be seen from FIG. 2A, the spring sleeve 36 at its brake pedal-side end has a hollow-cylindrical portion 36A, which is adjoined by a radially outwardly extending collar 36F. Said collar is not of an uninterrupted construction in peripheral direction but has a series of slot-like recesses 36G.

To fasten the spring sleeve 36 to the input element 20, the spring sleeve 36 is first introduced in actuating direction of the brake booster into the receiving sleeve 20A in such a way that the collar 36F of the spring sleeve 36 comes into abutment with a step 20E formed at the brake pedal-side end of the receiving sleeve 20A. The spring sleeve 36 is then connected to the receiving sleeve 20A by beading a hollow-cylindrical extension 20D of the receiving sleeve 20A which, in its initial position, extends parallel to the longitudinal axis A. The collar 36F of the spring sleeve 36 is then disposed according to FIG. 2A between the step 20E and the beaded extension 20D of the receiving sleeve 20A extending at right angles to the longitudinal axis A.

According to FIG. 2, the spring sleeve 36 formed from spring-elastic sheet metal comprises a plurality of spring elements 36C, 36D, which in actuating direction adjoin the hollow-cylindrical portion 36A of the spring sleeve 36. Two of said spring elements 36C, 36D are shown in FIG. 2. The spring elements 36C, 36D are separated by a slot 36B and extend substantially axially relative to a longitudinal axis A. A bent portion 36E disposed in the transitional region between the hollow-cylindrical region 36A and the spring elements 36C, 36D guarantees that the free ends of the spring elements 36C, 36D facing the working chamber 16 extend radially inwards relative to the longitudinal axis A. The spring elements 36C, 36D have a width, which diminishes in actuating direction.

The receiving sleeve 20A of the input element 20 has an inside diameter, which diminishes step by step in actuating direction, and the actuating rod 34 according to FIG. 3 has a corresponding outside diameter diminishing in actuating direction. As may be seen from FIG. 3, the actuating rod 34 at its brake pedal-side end has a fork-shaped extension 34G for coupling the actuating rod 34 to the brake pedal. An end of the actuating rod 34 facing the working chamber 16 has a spherical load transmission face 34A. Said spherical load transmission face 34A cooperates in actuating direction with a corresponding portion 20B of the receiving sleeve 20A, which portion has an inside diameter tapering in actuating direction.

The spherical load transmission face 34A opens counter to actuating direction into a cylindrical portion 34B of the actuating rod 34. The cylindrical portion 34B in turn verges counter to actuating direction into a conical portion 34C having a radial extension increasing counter to actuating direction. Said conical portion 34C is adjoined counter to actuating direction by a further conical portion 34D having a radial extension decreasing counter to actuating direction. The conical portion 34D is followed, counter to actuating direction, by a further conical portion 34E having a radial extension increasing counter to actuating direction. Finally, said further conical portion 34E is adjoined counter to actuating direction by a cylindrical portion 34F, the diameter of which is greater than the diameter of the cylindrical portion 34B disposed in actuating direction upstream thereof.

The two conical portions 34D and 34E form an asymmetrical, notch-shaped profile. The asymmetry is occasioned by the conical portion 34D having a greater inclination than the conical portion 34E disposed in actuating direction downstream thereof.

In FIG. 3 the input element 20 is illustrated with the actuating rod 34 fully introduced into the receiving sleeve 20A. As the actuating rod 34 is introduced into the receiving sleeve 20A of the input element 20, the spring elements 36C, 36D are first bent elastically in a radially outward direction by the spherical load transmission face 34A of the actuating rod 34. Said radially outward deformation of the spring elements 36C, 36D continues until the conical portion 34C has passed the spring elements 36C, 36D in actuating direction. The spring elements 36C, 36D then latch into the notch-shaped profile formed by the conical portions 34D and 34E of the actuating rod 34. The actuating rod 34 reaches a detent position, as shown in FIG. 3.

In the detent position illustrated in FIG. 3, the free ends of the spring elements 36C, 36D open in actuating direction approximately at a right angle into the conical portion 34D of the actuating rod 34. Thus, if tensile forces are exerted counter to actuating direction upon the actuating rod 34, said tensile forces are introduced via the conical portion 34D axially into the free ends of the spring elements 36C, 36D. The axial forces introduced in said manner into the spring elements 36C, 36D are in turn transmitted, because of the rigid connection of the spring sleeve 36 to the receiving sleeve 20A, to the latter. Consequently, the actuating rod 34 is securely locked against withdrawal.

The inclination of the, in actuating direction, first conical portion 34E of the actuating rod 34 was selected in such a way that the spring elements 36C, 36D in the detent position are in approximately full surface abutment with the conical portion 34E.

The inclination of the conical portion 34D was selected in such a way as to guarantee under all circumstances a zero-backlash abutment of the load transmission face 34A against the base of the receiving sleeve 20A. Depending on the, because of component tolerances, slightly differing length of the spring elements 36C, 36D, the latter may namely come at differing points of the conical portion 34D supportingly into abutment with the latter, while an approximately right-angled introduction of force from the conical face 34 into each of the spring elements 36C, 36D is always guaranteed. Thus, the spring elements 36C, 36D at each abutment point of the conical portion 34D develop supporting forces which, in a defined manner, prevent the actuating rod 34 from being pulled out of the receiving sleeve 20A.

Figure 4:
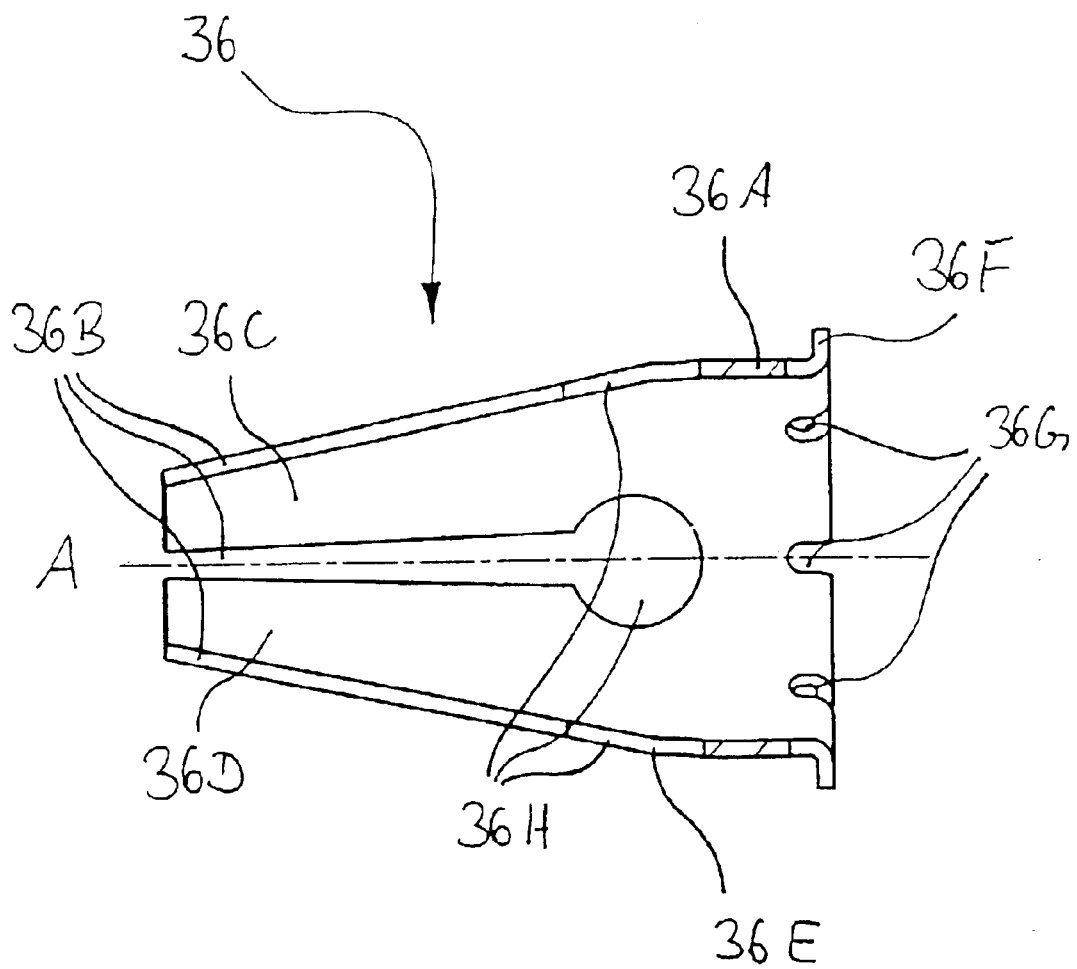

FIG. 4 shows a further possible way of refining the spring sleeve 36. The illustrated spring sleeve 36 may be used both in the brake booster according to the invention as well as in other brake boosters or load transmission arrangements.

The spring sleeve 36 illustrated in FIG. 4 substantially corresponds to the spring sleeve illustrated in FIG. 2. Thus, the spring sleeve 36 illustrated in FIG. 4 likewise has a hollow-cylindrical portion 36A adjoined in actuating direction by a total of four spring elements, of which two spring elements 36C, 36D are shown. Adjacent spring elements 36C, 36D are separated in each case by an axially extending slot. Of the four slots, three slots 36B are shown in FIG. 4.

At its end facing the hollow-cylindrical portion 36A each slot 36B opens into a circular recess 36H. The restoring forces of the spring elements 36C, 36D may be adjusted by varying the diameter of the circular recesses 36H. Although the recesses 36H, into which the slots 36B open, may in principle have a shape differing from the circular shape, the circular shape is particularly advantageous for reducing notch stresses.

Figure 5:
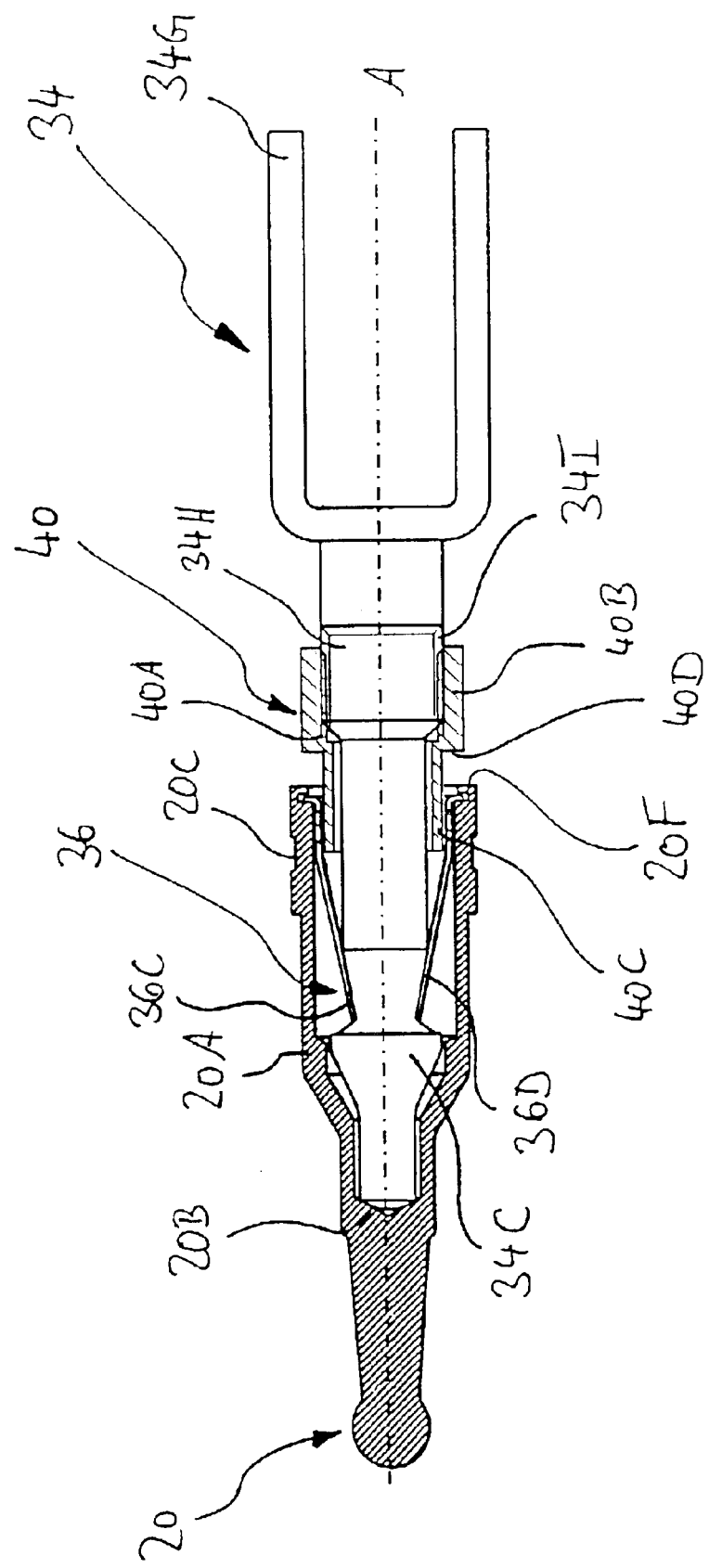

FIG. 5 shows the load transmission arrangement known from FIG. 3 with an additional actuating element 40 for the spring elements 36C, 36D. The actuating element 40 allows the releasing of the actuating rod 34 from the detent position shown in FIGS. 3 and 5 and may also be used in a brake booster different to the brake booster according to the invention.

The actuating element 40 takes the form of a stepped, hollow-cylindrical sleeve and is screwed onto a diameter enlargement 34H having a threaded portion 34I of the actuating rod 34. For said purpose, the actuating element 40 has radially at the inside of its end facing the brake pedal a complementary threaded portion 40A. The screw-type connection between the actuating element 40 and the actuating rod 34 enables an axial relative motion between the actuating piston 34 and the actuating element 40.

The thread 40A of the actuating element 40 is formed on a rear portion 40B of the actuating element 40 facing the brake pedal. Said portion 40B carrying the thread 40A has a suitably structured external contour, which allows the actuating element 40 to be rotated manually or with the aid of a tool.

The thread-carrying portion 40B of the actuating element 40 is adjoined in actuating direction of the brake booster by a front portion 40C with a smaller outside diameter and a smaller inside diameter than the thread-carrying portion 40B. The front portion 40C of the actuating element 40 extends, in the initial position of the actuating element 40, partially into the spring sleeve 36.

To release the actuating rod 34 from the detent position shown in FIG. 5, i.e. to separate the actuating rod 34 from the input element 20, the actuating element 40 is rotated out of its initial position shown in FIG. 5 in such a way that it moves relative to the actuating rod 34 in actuating direction of the brake booster. The actuating element 40 therefore executes, in FIG. 5, an axial movement to the left. As a result of said axial movement the front portion 40C of the actuating element 40 contacts the spring elements 36C, 36D of the spring sleeve 36. Because of the cooperation between the actuating element 40 and the spring elements 36C, 36D, the spring elements 36C, 36D swivel radially outwards.

As soon as the spring elements 36C, 36D have been swivelled radially outwards to such an extent that the smallest distance between opposing spring elements is greater than the maximum diameter of the conical portion 34C of the actuating rod 34, the actuating rod 34 may be withdrawn from the receiving sleeve 20A. The withdrawing of the actuating rod 34 from the receiving sleeve 20A is effected likewise by means of the actuating element 40. The axial length of the front portion 40C of the actuating element 40 is selected in such a way that the expansion of the spring elements 36C, 36D required for withdrawal of the actuating rod 34 from the receiving sleeve 20A is achieved before a step 40D of the actuating element 40 facing the input element 20 contacts an end face 20F of the receiving sleeve 20A facing said step 40D. The step 40D is formed at the transition between the front portion 40C and the thread-carrying portion 40B of the actuating element. The end face 20F is formed, as is evident from FIG. 2A, by a surface of the beaded region 20D of the receiving sleeve 20A.

As soon as the actuating element 40 has engaged far enough into the spring sleeve 36 and/or the receiving sleeve 20A for the step 40D of the actuating element 40 to contact the end face 20F of the receiving sleeve 20A, a further rotation of the actuating element 40 causes the actuating rod 34 to be withdrawn from the spring sleeve 36. The reason for this is that, on the one hand, the actuating element 40 is supported via its step 40D against the end face 20F of the receiving sleeve 20A and, on the other hand, the actuating rod 34 as a result of the rotation of the actuating element 40 executes an axial movement relative to the actuating element 40 counter to the actuating direction of the brake booster.

The connection according to the invention of actuating rod and input element may be realized in all types of brake booster and, in particular, also in hydraulic brake boosters.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Brake booster comprising
 an input element for actuating the brake booster, which
  input element at a brake pedal-side end has a receiving sleeve for an actuating rod, which is to be coupled to the brake pedal, and a spring sleeve disposed at least partially inside the receiving sleeve and having at least one spring element, which cooperates with the actuating rod when the latter is brought into a detent position in relation to the input element, wherein the spring element extends substantially in axial direction and is actuable in a spring-elastic manner in a radially outward direction, wherein the spring sleeve at its brake pedal-side end has a radially outwardly extending portion, which is fastened by means of a bead of the receiving sleeve to the receiving sleeve.

2. Brake booster according to claim 1, wherein the radially outwardly extending portion of the spring sleeve takes the form of a collar.

3. Brake booster according to claim 1, wherein the spring sleeve comprises two or more spring elements, which surround the radially outer side of the actuating rod.

4. Brake booster according to claim 3, wherein each two spring elements adjacent in peripheral direction of the actuating rod are separated from one another by, in each case, a slot extending substantially in axial direction.

5. Brake booster according to claim 4, wherein each slot at its brake pedal-side end opens into a widened portion extending in peripheral direction of the spring sleeve.

6. Brake booster according to claim 5, wherein each slot at its brake pedal-side end opens into a circular recess.

7. Brake booster according to claim 1, wherein an, in actuating direction of the brake booster, front free end of the spring element is actuable in a spring-elastic manner.

8. Brake booster according to claim 1, wherein the spring element cooperates, preferably via its free end, counter to the actuating direction of the brake booster with a first oblique face of the actuating rod.

9. Brake booster according to claim 8, wherein the free end of the spring element opens approximately at right angles into the first oblique face.

10. Brake booster according to claim 8, wherein the actuating rod has, in actuating direction upstream of the first oblique face, a second oblique face which is inclined in such a way that the first oblique face and the second oblique face together form a notch-shaped profile.

11. Brake booster according to claim 10, wherein the spring element in the detent position is situated at least in sections in surface contact with the second oblique face of the actuating rod.

12. Brake booster according to claim 8, wherein the actuating rod has, in actuating direction downstream of the first oblique face, a third oblique face, which has a radial extension decreasing in actuating direction and which during introduction of the actuating rod into the detent position cooperates with the spring element.

13. Brake booster according to claim 8, wherein at least one of the oblique faces of the actuating rod is designed as a conical portion.

14. Brake booster according to claim 1, wherein the receiving sleeve at its brake pedal-side end is flannel-shaped with an inside diameter decreasing in actuating direction.

15. Brake booster according to claim 14, wherein the receiving sleeve at its brake pedal-side end has a funnel-shaped component.

16. Brake booster according to claim 15, wherein, for fastening the funnel-shaped component to the receiving sleeve, a peripherally extending rib of one of said components is introduced into a peripherally extending groove of the other component.

17. Brake booster according to claim 1, wherein an actuating element, which is movable in axial direction relative to the actuating rod, is provided for actuating the at least one spring element.

18. Brake booster according to claim 17, wherein the actuating element has a portion, which extends into the spring sleeve.

19. Brake booster according to claim 17, wherein the actuating element radially at the outside has a step, which cooperates with an end face of the receiving sleeve facing the step.

20. Brake booster according to claim 17, wherein the actuating element is sleeve-shaped.

21. Brake booster according to claim 17, wherein the actuating element is coupled by means of a screw-type connection to the actuating rod.

* * * * *